(12) United States Patent
Li

(10) Patent No.: US 11,878,751 B2
(45) Date of Patent: Jan. 23, 2024

(54) CLIMBING MACHINE AND MOVING METHOD THEREFOR

(71) Applicants: ZHEJIANG UNIVERSITY, Zhejiang (CN); Hangzhou Fuya Science and Technology Co. Ltd., Zhejiang (CN)

(72) Inventor: Xin Li, Zhejiang (CN)

(73) Assignees: ZHEJIANG UNIVERSITY, Hangzhou (CN); HANGZHOU FUYA SCIENCE AND TECHNOLOGY CO. LTD., Hangzhou (CN)

( * ) Notice: Subject to any disclaimer, the term of this patent is extended or adjusted under 35 U.S.C. 154(b) by 259 days.

(21) Appl. No.: 17/156,433

(22) Filed: Jan. 22, 2021

(65) Prior Publication Data
US 2021/0253187 A1    Aug. 19, 2021

(30) Foreign Application Priority Data

Feb. 18, 2020  (CN) .......................... 202010098322.X

(51) Int. Cl.
*B62D 57/024*    (2006.01)
*B25J 5/00*    (2006.01)

(52) U.S. Cl.
CPC .............. *B62D 57/024* (2013.01); *B25J 5/00* (2013.01)

(58) Field of Classification Search
CPC ................................. B62D 57/024; B62J 5/00
See application file for complete search history.

(56) References Cited

U.S. PATENT DOCUMENTS

| 7,765,032 | B2 * | 7/2010 | Huston | ..................... H01F 7/04 |
| | | | | 180/164 |
| 10,112,664 | B2 * | 10/2018 | Li | ............................ B25J 15/06 |
| 10,829,170 | B2 * | 11/2020 | Li | .......................... B25J 9/1697 |
| 11,191,411 | B2 * | 12/2021 | Vezina | ................ A47L 11/4036 |
| 2018/0207793 | A1 * | 7/2018 | Zheng | ......................... B25J 5/00 |
| 2022/0094301 | A1 * | 3/2022 | Li | ............................ B66D 3/00 |

FOREIGN PATENT DOCUMENTS

| CN | 206702730 U | * 12/2017 | |
| CN | 108466250 A | * 8/2018 | .............. B25J 19/00 |
| CN | 109222778 A | * 1/2019 | |
| JP | 2008260436 A | * 10/2008 | |
| JP | 2011255490 A | * 12/2011 | |

\* cited by examiner

*Primary Examiner* — Minnah L Seoh
*Assistant Examiner* — Hosam Shabara
(74) *Attorney, Agent, or Firm* — McCoy Russell LLP

(57) ABSTRACT

The present invention relates to a climbing machine and a moving method therefor. The climbing machine includes a machine body, a mechanical arm, and at least two ropes, each rope connects a suspension mechanism and the machine body; the suspension mechanism is connected to or disengaged from an object structure, the length of the rope between the suspension mechanism and the machine body is variable; through dragging or pulling of the rope, the machine body can move on the object structure; the mechanical arm connects a gripping mechanism and the machine body; the gripping mechanism can grip and move any suspension mechanism and disengage a gripped suspension mechanism. In the present invention, the machine body moves without interference, and can be pulled not only on a smooth surface but also on a hollow or bending surface, and features a simple structure, a wide application scope, and the like.

11 Claims, 10 Drawing Sheets

CLIMBING MACHINE AND MOVING METHOD THEREFOR

CROSS REFERENCE TO RELATED APPLICATION

The present application claims priority to Chinese Patent Application No. 202010098322.X filed on Feb. 18, 2020. The entire contents of the above-listed application is hereby incorporated by reference for all purposes.

TECHNICAL FIELD

The present invention pertains to the field of complex-structure moving technologies, and in particular, to a climbing machine and a moving method therefor.

BACKGROUND

Climbing robots are important high-altitude special robots. For example, a detection robot for a large road/bridge or a large oil tank or a large ship needs a mechanism that can climb and move on a wall surface, and a detection instrument is mounted on the climbing robot. The climbing robot is usually mounted with a suction mechanism. A suction force is generated between the suction mechanism and the wall surface, and the suction force causes a friction force between the robot and the wall surface. The friction force overcomes the gravity of the robot and further provides a driving force for the robot to move. The suction mechanism usually uses vacuum suction or magnetic suction. However, such a robot has the following problems:

(1) An object surface under suction needs to be a complete surface regardless of whether the robot uses vacuum suction or magnetic suction. If the object surface under suction is a hollow surface, for example, a wire mesh, a steel frame, or a wooden fence, clearly, serious vacuum leakage occurs in vacuum suction, and there is no sufficient suction area for a magnetic suction mechanism to generate an enough magnetic force.

(2) If a climbed object is not a plane but a structure with a complex shape, for example, a bending surface with a surface M and a surface N, an existing vertical facade mobile robot (a wheel-driven structure) cannot move from the surface M to the surface N, because the suction force of the suction mechanism becomes invalid in a process of moving from the surface M to the surface N. For example, when sucking a bending object surface, the suction mechanism cannot adhere to the object surface, which causes a suction failure.

(3) Theoretically, a multi-joint multi-legged robot can cross a bending surface. However, it is very difficult to design such a robot, as the multi-joint multi-legged design makes a robot mechanism very complex. In addition, many joint motors are needed, which greatly increases the robot weight. An increase of the robot weight is very detrimental to climbing a vertical facade, imposes a high requirement on the suction force of the suction mechanism, and raises a falling risk.

SUMMARY

To resolve a technical problem, the present invention provides a climbing machine and a moving method therefor. The climbing machine can not only move on a smooth surface, but also move on a complex structure (such as an iron tower, a wire mesh, or a steel frame) with a hollow surface. In addition, the climbing machine has a simple structure and a wide application scope, moves without interference, and features high safety.

The present invention is implemented as follows: A climbing machine is provided, including a machine body, a mechanical arm, and at least two ropes, where one end of each rope is connected to a suspension mechanism, and the other end of the rope is connected to the machine body; the suspension mechanism is connected to or disengaged from an object structure, and the length of the rope between the suspension mechanism and the machine body is variable; through dragging or pulling of the rope, the suspension mechanism enables the machine body to move on the object structure; the mechanical arm has one or more degrees of freedom; a gripping mechanism is disposed at a front end of the mechanical arm, and a rear end of the mechanical arm is mounted on the machine body; the gripping mechanism has a spatial movement capability and/or an angle adjustment capability when driven by the mechanical arm, and is capable of gripping and moving any suspension mechanism and being disengaged from a gripped suspension mechanism.

Further, the machine body includes a reel mechanism, and the reel mechanism winds or releases the rope between the machine body and the suspension mechanism to change the length of the rope, so that the machine body is capable of moving on the object structure.

Further, the suspension mechanism includes a reel mechanism, and the reel mechanism winds or releases the rope between the suspension mechanism and the machine body to change the length of the rope, so that the machine body is capable of moving on the object structure.

Further, the gripping mechanism includes a magnetic suction device, a magnetically sucked magnetic conductive surface is disposed on the suspension mechanism, and the magnetic suction device is capable of sucking or being disengaged from the suspension mechanism.

Further, the gripping mechanism includes a mechanical claw, and the mechanical claw opens or closes to disengage or grip the suspension mechanism.

Further, the suspension mechanism includes a hook, and the hook hooks or disengages the object structure, to implement connection or disengagement between the suspension mechanism and the object structure.

Further, the suspension mechanism includes a sucker, and the sucker is used to suck or disengage the object structure, to implement suction or disengagement between the suspension mechanism and the object structure.

Further, one or more damping mechanisms are disposed on the machine body, and the damping mechanism is capable of generating a damping force by using an air flow.

Further, the damping mechanism includes a rotor apparatus, and the rotor apparatus uses a force generated by a rotor through rotation in the air to reduce shaking of the machine body in a suspended state.

Further, the damping mechanism includes an air injection apparatus, and the air injection apparatus uses a reaction thrust of air injection to reduce shaking of the machine body in a suspended state.

Further, a shaking state detection apparatus is disposed on the machine body, and the shaking state detection apparatus is capable of detecting a shaking state of the machine body.

Further, several wheels are disposed on the machine body.

The present invention is implemented as follows: A moving method for the climbing machine described above is provided, including the following steps:

step 1: moving, by the mechanical arm, the gripping mechanism to one of the suspension mechanisms, so that the gripping mechanism is connected to the suspension mechanism; increasing the length of the rope between the suspension mechanism and the machine body, so that the rope is in a loose state; placing, by the mechanical arm, the suspension mechanism in a proper position on the object structure, so that the suspension mechanism is connected to the object structure; and disengaging, by the gripping mechanism, the suspension mechanism;

step 2: repeating step 1 based on an actual requirement, so that other suspension mechanisms are placed in proper positions on the object structure and are connected to the object structure;

step 3: shortening the length of a rope between each suspension mechanism and the machine body, so that the rope pulls the machine body to move on the object structure; and step 4: repeating step 1, step 2, and step 3, so that the machine body is capable of moving on the object structure.

Compared with the prior technology, according to the climbing machine and the moving method therefor in the present invention, the climbing machine includes the machine body, the mechanical arm, and the at least two ropes, where one end of each rope is connected to the suspension mechanism, and the other end of the rope is connected to the machine body; the suspension mechanism is connected to or disengaged from the object structure, and the length of the rope between the suspension mechanism and the machine body is variable; the suspension mechanism pulls or drags the machine body by using the rope to enable the machine body to move on the object structure; the gripping mechanism is disposed at the front end of the mechanical arm; the gripping mechanism has the spatial movement capability and/or the angle adjustment capability when driven by the mechanical arm, and is capable of gripping and moving any suspension mechanism and being disengaged from a gripped suspension mechanism. In the present invention, no interference occurs when the machine body is driven to move, and safety is high. Therefore, the machine body can be pulled not only on a smooth surface, but also on a hollow surface (for example, a wire mesh or a wooden fence) and a complex structure (for example, a steel frame, an iron tower, or a tree branch). The present invention features a simple structure, a wide application scope, and the like.

DETAILED DESCRIPTION

To make the problems to be resolved, technical solutions, and beneficial effects of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
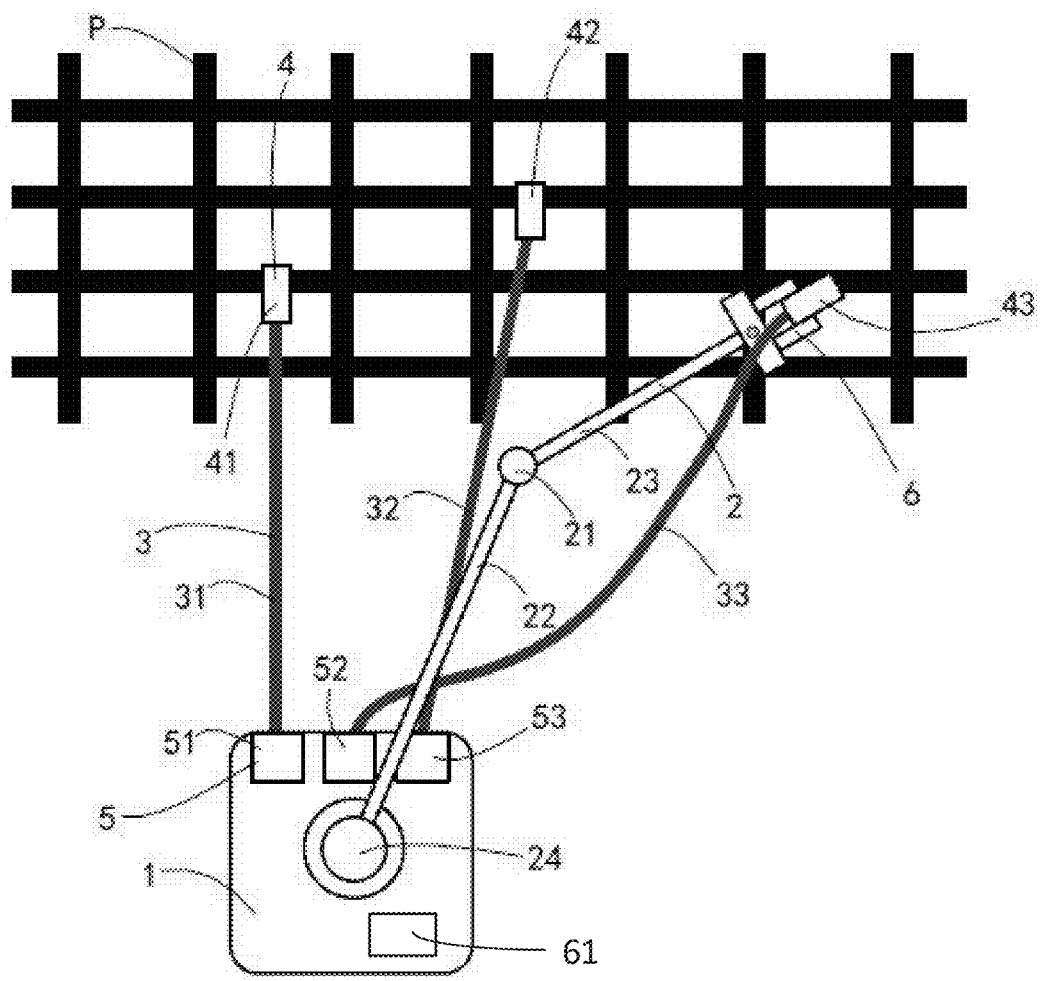
FIG. 1 is a schematic plan view of a structural principle of a first embodiment of a climbing machine according to the present invention.

FIG. 1 shows a preferred embodiment of a climbing machine according to the present invention. The climbing machine includes a machine body 1, a mechanical arm 2, and at least two ropes 3. One end of each rope is connected to a suspension mechanism 4, and the other end of the rope is connected to the machine body 1. The suspension mechanism 4 is connected to or disengaged from an object structure P. The length of the rope 3 between the suspension mechanism 4 and the machine body 1 is variable. The suspension mechanism 4 drags or pulls the machine body 1 by using the rope 3 to enable the machine body 1 to move on the object structure P.

In another optional mounting form, the machine body 1 includes a reel mechanism 5. One end of each rope 3 is connected to the suspension mechanism 4, and the other end is connected to the reel mechanism 5 on the machine body 1. The reel mechanism 5 winds and releases the rope 3 between the machine body 1 and the suspension mechanism 4 to change the length of the rope, so that the machine body 1 can move on the object structure P.

In another optional mounting form, the suspension mechanism 4 includes a reel mechanism 5. One end of each rope 3 is connected to the machine body 1, and the other end is connected to the reel mechanism 5 on the suspension mechanism 4. The reel mechanism 5 winds and releases the rope 3 between the suspension mechanism 4 and the machine body 1 to change the length of the rope, so that the machine body 1 can move on the object structure P.

The suspension mechanism 4 can be connected to or disengaged from the object structure P. The suspension mechanism 4 drags or pulls the machine body 1 by using the rope 3 to enable the machine body 1 to move on the object structure P. The object structure P can be a smooth wall surface, a glass surface, or a hollow surface such as a wire mesh, a steel frame, an iron tower, a wooden fence, or a tree branch. The object structure P can be a planar structure (such as a wire mesh or a wall surface), or a three-dimensional structure (such as an iron tower). Therefore, the present invention is widely applicable.

The mechanical arm 2 has one or more degrees of freedom. A gripping mechanism 6 is disposed at a front end of the mechanical arm 2. A rear end of the mechanical arm 2 is mounted on the machine body 1. The gripping mechanism 6 has a spatial movement capability and/or an angle adjustment capability when driven by the mechanical arm 2, and is capable of gripping and moving any suspension mechanism 4 and being disengaged from a gripped suspension mechanism 4.

The following further describes various different structures of the climbing machine in the present invention with reference to specific embodiments.

Embodiment 1

FIG. 1 shows a first embodiment of a climbing machine according to the present invention. The climbing machine is provided with one mechanical arm 2, three ropes 3, and suspension mechanisms 4 connected to the ropes. The three ropes 3 are referred to as a first rope 31, a second rope 32, and a third rope 33. Correspondingly, three reel mechanisms 5 are referred to as a first reel mechanism 51, a second reel mechanism 52, and a third reel mechanism 53, and three suspension mechanisms 4 are referred to as a first suspension mechanism 41, a second suspension mechanism 42, and a third suspension mechanism 43. In this embodiment, one mechanical arm 2 and one gripping mechanism 6 successively operate the three ropes 3 and the suspension mechanisms 4 connected to the three ropes 3.

In an embodiment, the gripping mechanism 6 can be a magnetic suction device. The suspension mechanism 4 is provided with a magnetically sucked magnetic conductive surface, and the magnetic suction device is capable of sucking or being disengaged from the suspension mechanism. In this embodiment, the magnetic suction device is an electromagnetic iron. When the electromagnetic iron is powered on, generates a magnetic field, and approaches the suspension mechanism 4, the suspension mechanism 4 is sucked. When the electromagnetic iron is powered off, a magnetic force disappears, and the suspension mechanism 4 is disengaged.

Figure 2A:
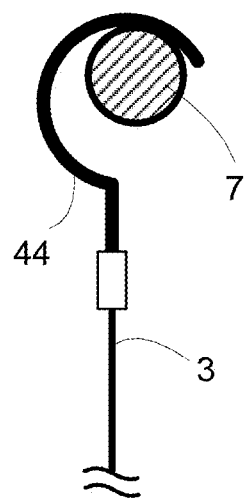
FIG. 2a is a schematic structural diagram of a state in which a hook and a bracket are combined in the first embodiment.

In still another embodiment, the gripping mechanism 6 is a mechanical claw, and the mechanical claw opens or closes to disengage or grip the suspension mechanism 4. The suspension mechanism 4 is a hook 44. An object structure P is a steel frame structure composed of many steel bars 7. The hook 44 is hooked to the steel bars 7, and the hook 44 and the steel bars 7 are connected to each other. The hook 44 can be disengaged from the steel bars 7, so that the hook 44 and the steel bars 7 are detached from each other, as shown in FIG. 2a.

Figure 2B:
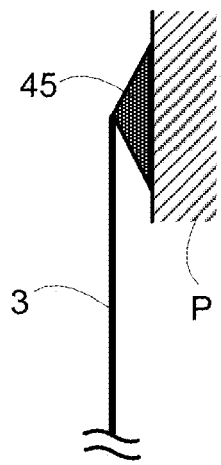
FIG. 2b is a schematic structural diagram of a state in which a vacuum sucker and a suction plane are under suction in the first embodiment.

In another embodiment, the suspension mechanism 4 can further be a sucker 45, and the sucker 45 is used to suck or disengage the object structure P, so as to implement suction or disengagement between the suspension mechanism 4 and the object structure P, as shown in FIG. 2b.

In this embodiment, the mechanical arm 2 is provided with a first lever arm 22 and a second lever arm 23. A lever arm revolute 21 is connected to one end of the first lever arm 22 and one end of the second lever arm 23. The other end of the first lever arm 22 is connected to a machine body 1 by using a body revolute 24. The lever arm revolute 21 and the body revolute 24 are separately controlled by using a motor. By controlling a rotation angle of the motor, positions and angles of the suspension mechanisms 4 can be controlled by using the mechanical arm 2. The suspension mechanisms 4 can be controlled to be in any spatial position and at any angle by increasing the quantity of joints or increasing a degree of freedom of each joint.

Embodiment 2

Figure 3:
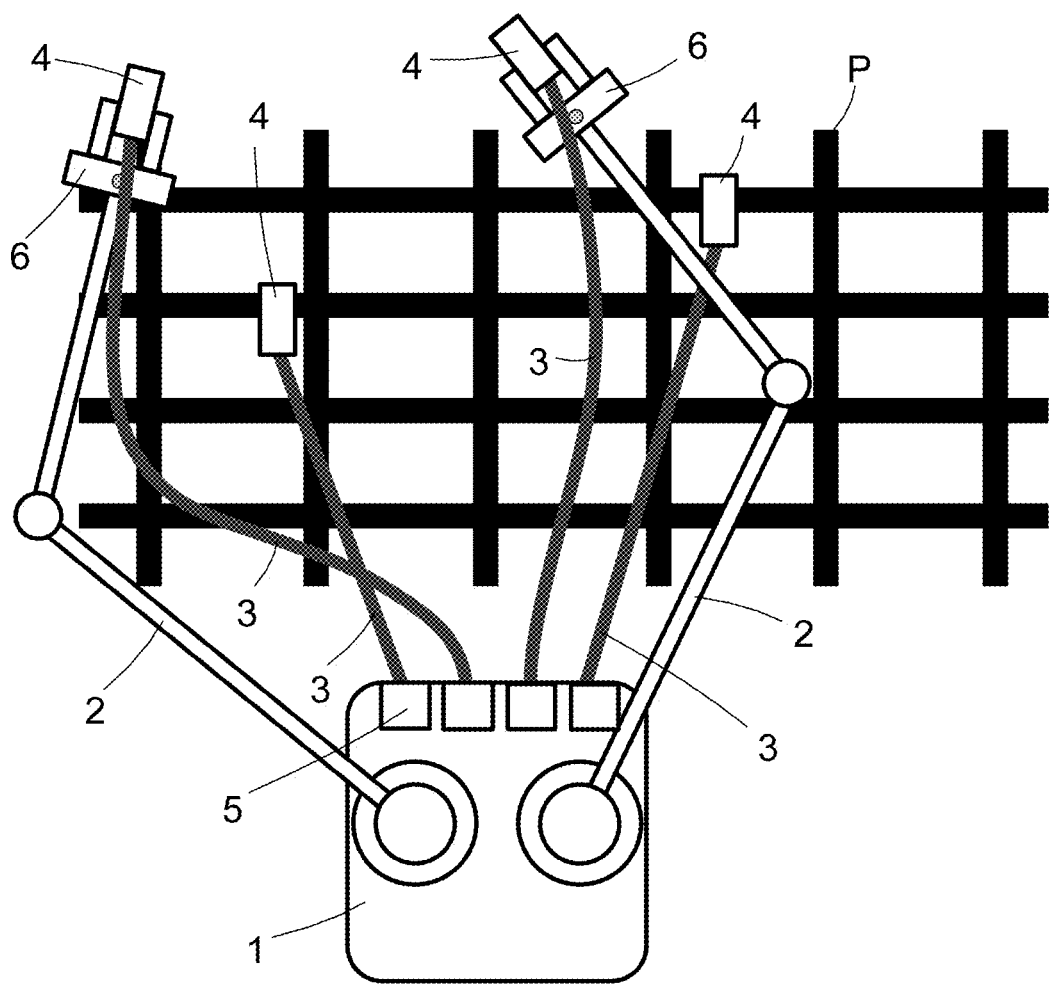
FIG. 3 is a schematic plan view of a structural principle of a second embodiment of a climbing machine according to the present invention.

FIG. 1 and FIG. 3 jointly show a second embodiment of a climbing machine according to the present invention. This embodiment differs from the first embodiment mainly in that the climbing machine is provided with two mechanical arms 2, four ropes 3, and suspension mechanisms 4 connected to the ropes 3. The quantity of mechanical arms 2 is less than the quantity of ropes 3 and the quantity of suspension mechanisms 4 connected to the ropes 3. Compared with the case in which one mechanical arm 2 successively operates the three suspension mechanisms 4 in the first embodiment, the two mechanical arms 2 can operate two suspension mechanisms 4 at the same time, thereby reducing the time for placing the suspension mechanisms 4 and improving overall movement efficiency of the mechanism.

Other structures and functions of this embodiment are the same as those of the first embodiment, and details are not repeated.

Embodiment 3

Figure 4:
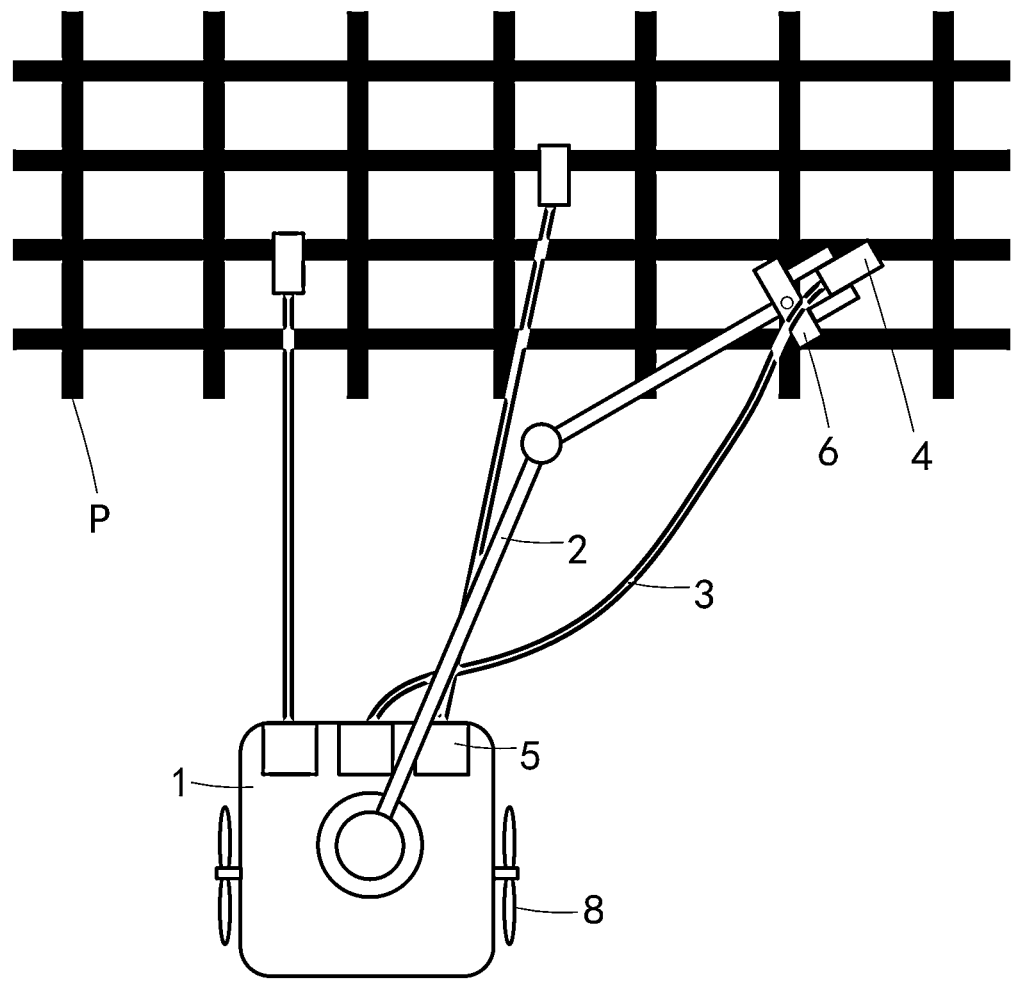
FIG. 4 is a schematic plan view of a structural principle of a third embodiment of a climbing machine according to the present invention.

FIG. 1 and FIG. 4 jointly show a third embodiment of a climbing machine according to the present invention. This embodiment differs from the first embodiment mainly in that one or more damping mechanisms 8 are disposed on the machine body 1, and the damping mechanism 8 can generate a damping force by using an air flow. For example, the damping mechanism 8 is one or more air injection apparatuses, which use a reaction thrust of air injection to generate the damping force, so as to reduce shaking of the machine body 1 in a suspended state. For another example, the damping mechanism 8 is one or more rotor apparatuses. The rotor apparatus uses a force generated by a rotor through rotation in the air to reduce shaking of the machine body 1 in the suspended state.

When the machine body 1 is suspended by a flexible rope 3, an action of the mechanical arm 2 causes the machine body 1 to shake. In addition, interference from an external force (for example, impact of a crosswind) also causes the machine body 1 to shake. Shaking of the machine body 1 causes an operation difficulty of the mechanical arm 2 to increase, and even causes the mechanical arm 2 to lose control in a serious case. Therefore, it is necessary to suppress shaking of the machine body 1 in a working process.

Disposing one or more rotor apparatuses in this embodiment can effectively reduce shaking of the machine body in the suspended state. A specific implementation is as follows: A shaking state detection apparatus 61 is disposed on the machine body 1 to detect a motion state (acceleration, a speed, and the like) of the machine body 1 in real time. For example, a multi-axis acceleration sensor is disposed in the shaking state detection apparatus 61 to detect a shaking frequency and acceleration of the machine body 1 in a spatial direction, and integrate the acceleration to obtain a speed and its time-varying changes. Then, the rotor apparatus of the damping mechanism 8 and the shaking state detection apparatus 61 form a control system. That is, the magnitude and the direction of a force of the rotor apparatus are controlled based on a shaking state of the machine body 1 fed back by the shaking state detection apparatus 61, thereby generating a damping effect of suppressing shaking of the machine body 1.

Other structures and functions of this embodiment are the same as those of the first embodiment, and details are not repeated.

Embodiment 4

Figure 5:
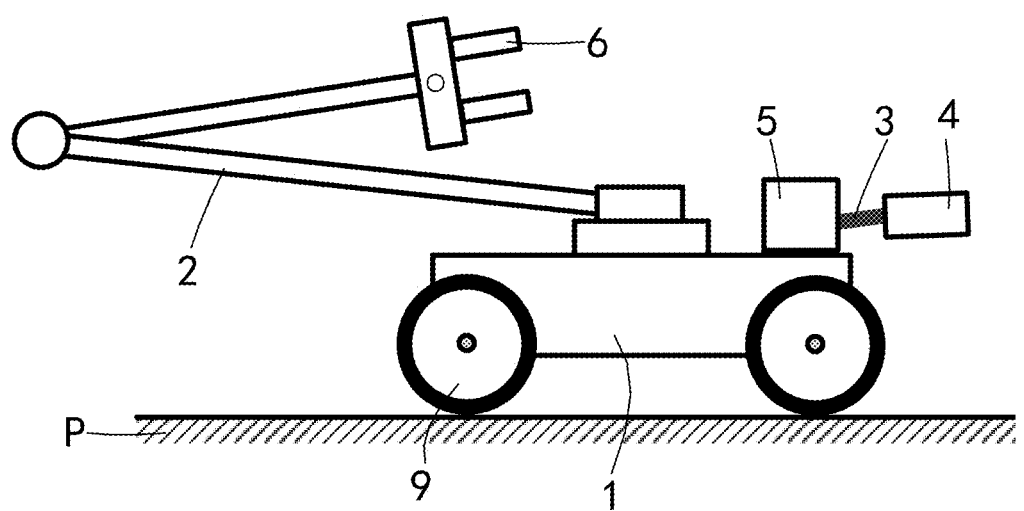
FIG. 5 is a schematic plan view of a structural principle of a fourth embodiment of a climbing machine according to the present invention.
Figure 6:
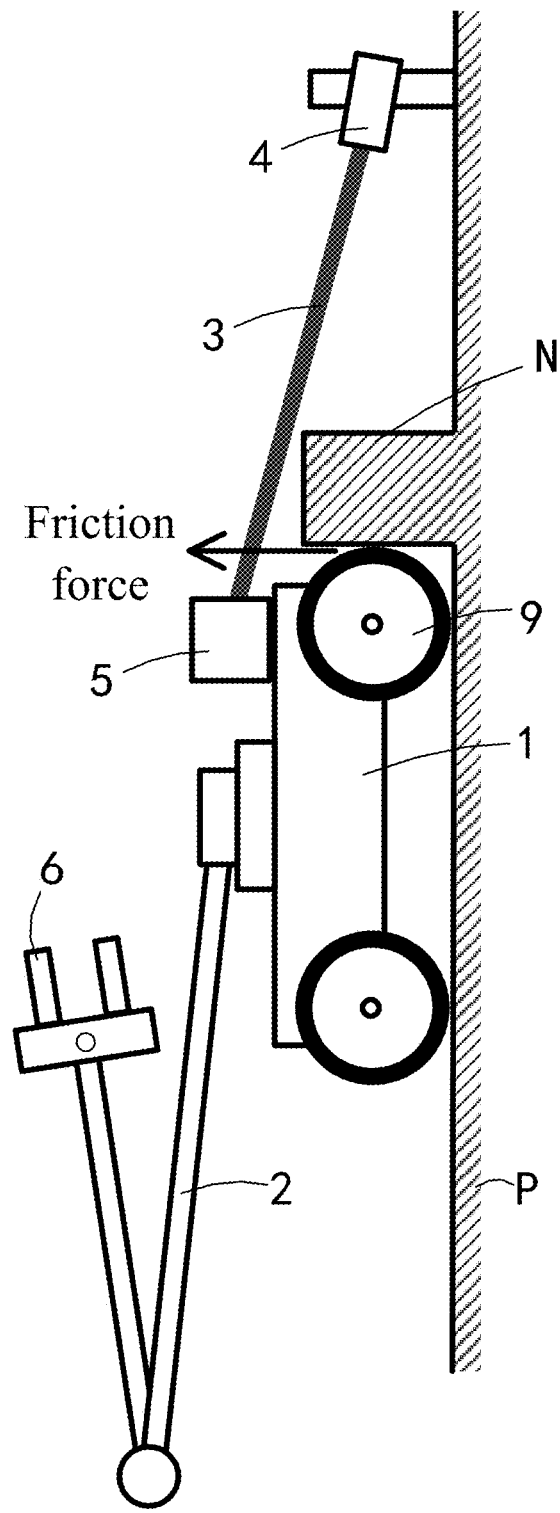
FIG. 6 is a schematic diagram of a state in which wheels of the climbing machine in FIG. 5 move across a protrusion.

FIG. 1 and FIG. 5 jointly show a fourth embodiment of a climbing machine according to the present invention. Several wheels 9 are mounted on the machine body 1. Advantages of disposing the wheels 9 include the following: (1) The wheels enable the whole mechanism to move efficiently on a horizontal ground. (2) As shown in FIG. 6, the reel mechanism 5 shortens the length of the rope between the machine body 1 and the suspension mechanism 4 by winding the rope, so that the machine body 1 moves upward. When there is a large protrusion N on the object structure P, if there is no wheel 9, the machine body 1 is stuck to the protrusion N. Consequently, an upward movement is blocked, and the mechanism can even be damaged by pulling in a serious case. Disposing the wheels 9 can properly solve this problem. When the wheels 9 are driven to rotate, a friction force can be formed between the wheels 9 and the protrusion N (as shown by an arrow in the figure). The friction force can drive the machine body 1 to move across the projection N.

Other structures and functions of this embodiment are the same as those of the first embodiment, and details are not repeated.

Referring to FIG. 1 and FIG. 7a to FIG. 7f, the present invention further discloses a moving method for the climbing machine described above, including the following steps:

Step 1: The mechanical arm 2 moves the gripping mechanism 6 to one of the suspension mechanisms 4, so that the gripping mechanism 6 is connected to the suspension mechanism 4. Increase the length of the rope 3 between the suspension mechanism 4 and the machine body 1, so that the rope 3 is in a loose state and has a proper length. The mechanical arm 2 places the suspension mechanism 4 in a proper position on the object structure P, so that the suspension mechanism 4 is connected to the object structure P. The gripping mechanism 6 disengages the suspension mechanism 4.

Step 2: Repeat step 1 based on an actual requirement, so that other suspension mechanisms 4 are placed in proper positions on the object structure P and are connected to the object structure P.

Step 3: Shorten the length of the rope 3 between each suspension mechanism 4 and the machine body 1, so that the rope 3 pulls the machine body 1 to move on the object structure P.

Step 4: Repeat step 1, step 2, and step 3, so that the machine body 1 is capable of moving on the object structure P.

The following provides a more detailed description by using an example in which the climbing machine is provided with one mechanical arm 2, three ropes 3, and suspension mechanisms 4 connected to the ropes 3.

Figure 7A:
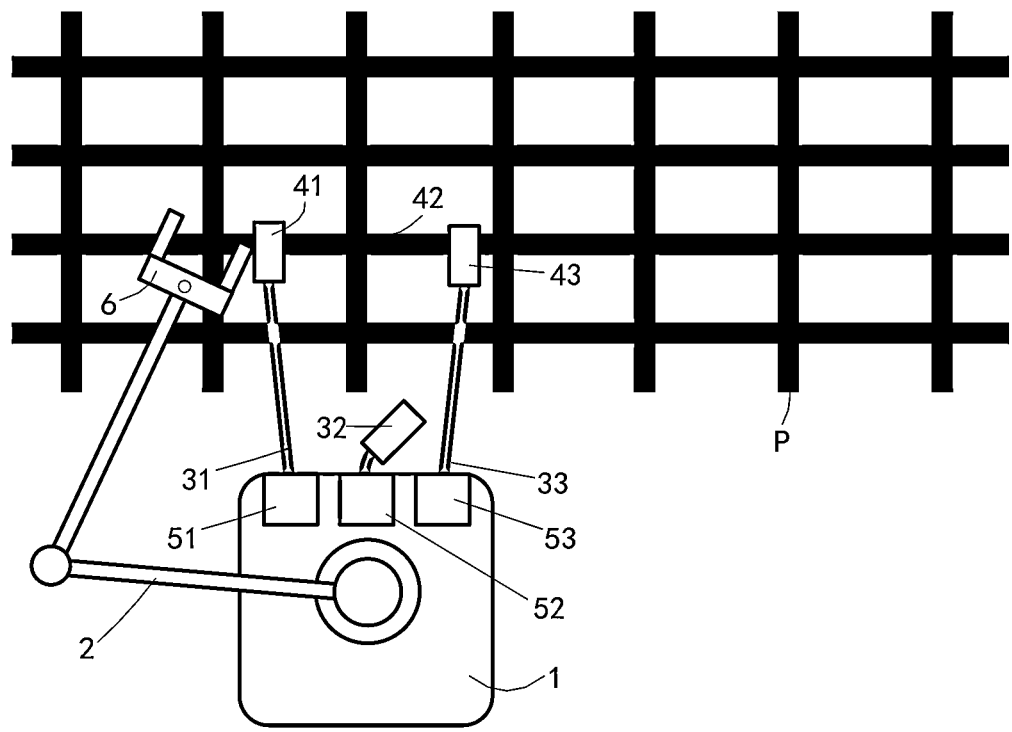
FIG. 7a to FIG. 7f are respectively schematic diagrams of steps of a rope pulling process of a climbing machine according to the present invention.

FIG. 7a shows an initial state. The three ropes 3 are referred to as a first rope 31, a second rope 32, and a third rope 33. Correspondingly, three reel mechanisms 5 are referred to as a first reel mechanism 51, a second reel mechanism 52, and a third reel mechanism 53, and three suspension mechanisms 4 are referred to as a first suspension mechanism 41, a second suspension mechanism 42, and a third suspension mechanism 43.

Figure 7B:
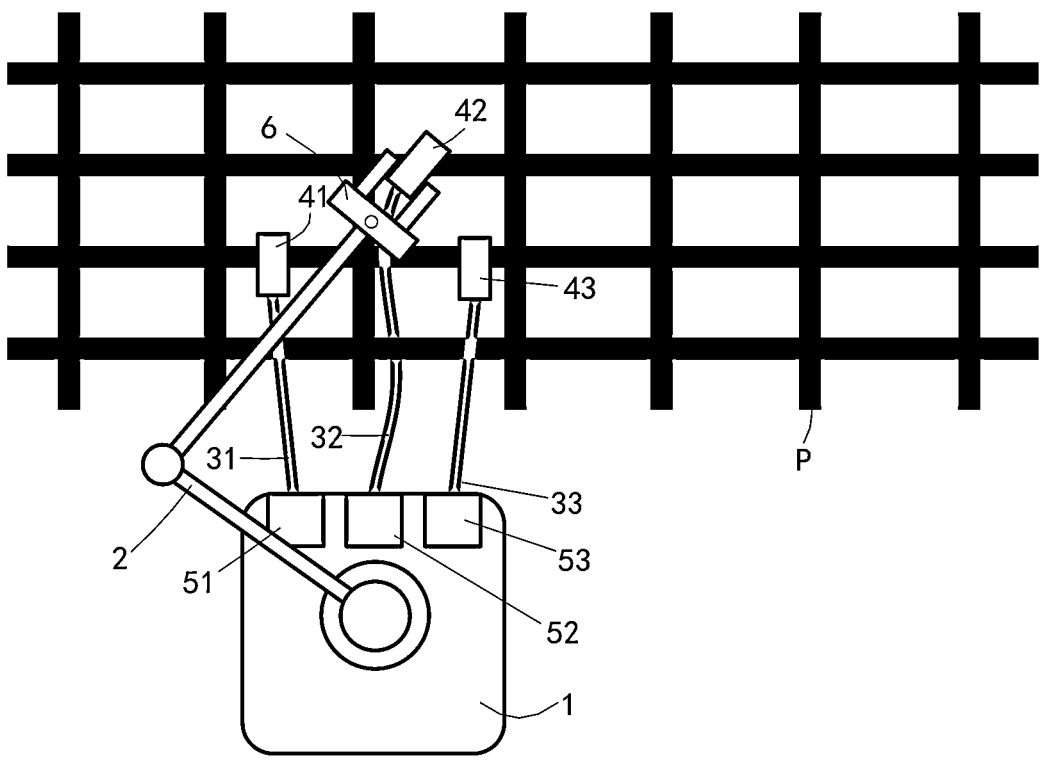

The climbing machine moves as follows: First, as shown in FIG. 7b, the mechanical arm 2 moves the gripping mechanism 6 to the suspension mechanism 42, so that the gripping mechanism 6 is connected to the suspension mechanism 42. The reel mechanism 52 increases the length of the rope 32 between the suspension mechanism 42 and the machine body 1 by releasing the rope, so that the rope 32 is in the loose state and has a proper length. The mechanical arm 2 places the suspension mechanism 42 in a proper position on the object structure P, so that the suspension mechanism 42 is connected to the object structure P. The gripping mechanism 6 disengages the suspension mechanism 42. This process is equivalent to step 1 described above.

Figure 7C:
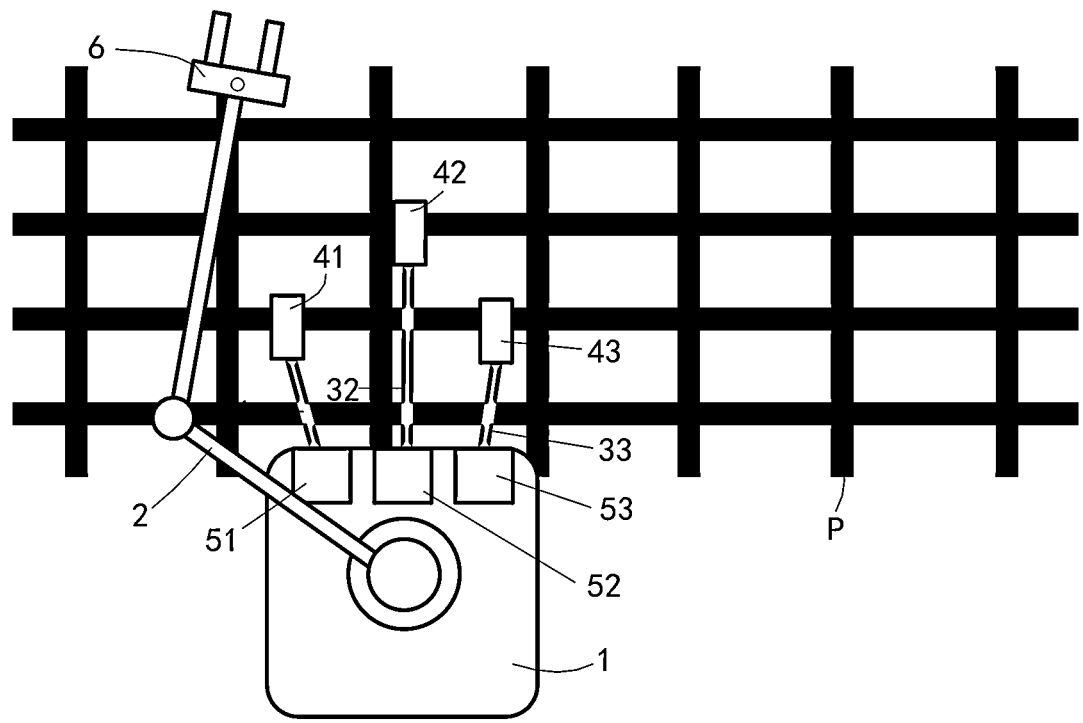

In this case, the three suspension mechanisms 4 are all connected to the object structure P. Then, as shown in FIG. 7c, the three reel mechanisms 5 wind the ropes to shorten the lengths of the ropes between the three suspension mechanisms 4 and the machine body 1, so that the ropes pull the machine body 1 to move on the object structure P. This process is equivalent to step 3 described above.

So far, the machine body has completed one movement. In this movement, step 2 described above is not mandatory.

Next, in the state shown in FIG. 7c, a next moving process is described.

Figure 7D:
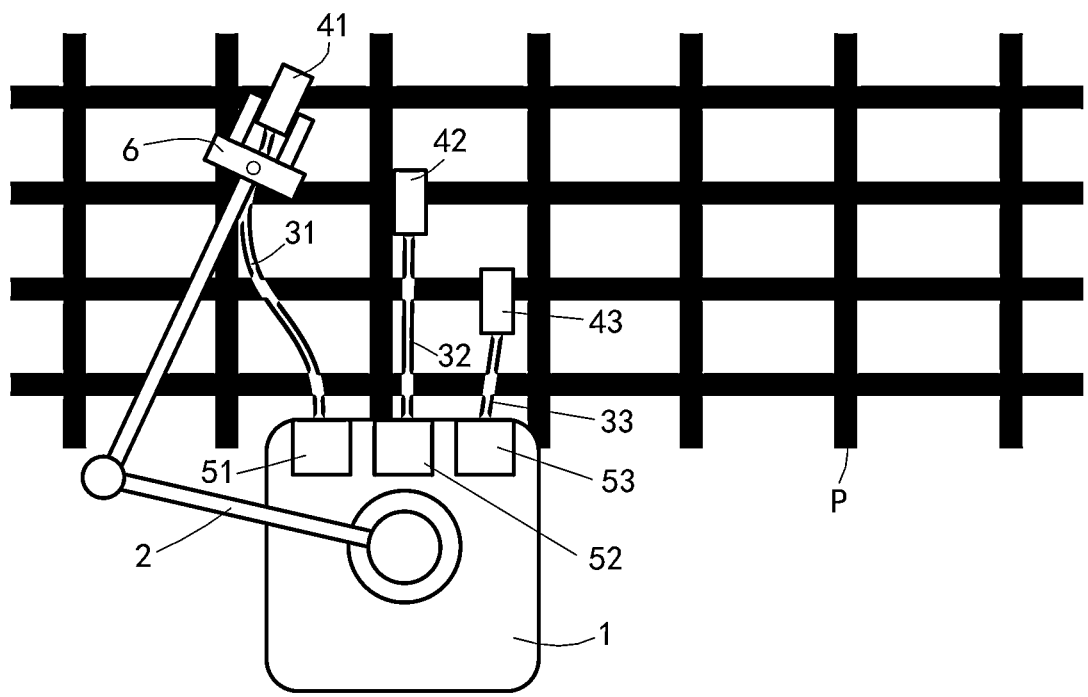

First, as shown in FIG. 7d, the mechanical arm 2 moves the gripping mechanism 6 to the suspension mechanism 41, so that the gripping mechanism 6 is connected to the suspension mechanism 41. The length of the rope 31 between the suspension mechanism 41 and the machine body 1 is increased, so that the rope 31 is in the loose state and has a proper length. The mechanical arm 2 places the suspension mechanism 41 in a proper position on the object structure P, so that the suspension mechanism 41 is connected to the object structure P. The gripping mechanism 6 disengages the suspension mechanism 41. This process is equivalent to step 1 described above.

Figure 7E:
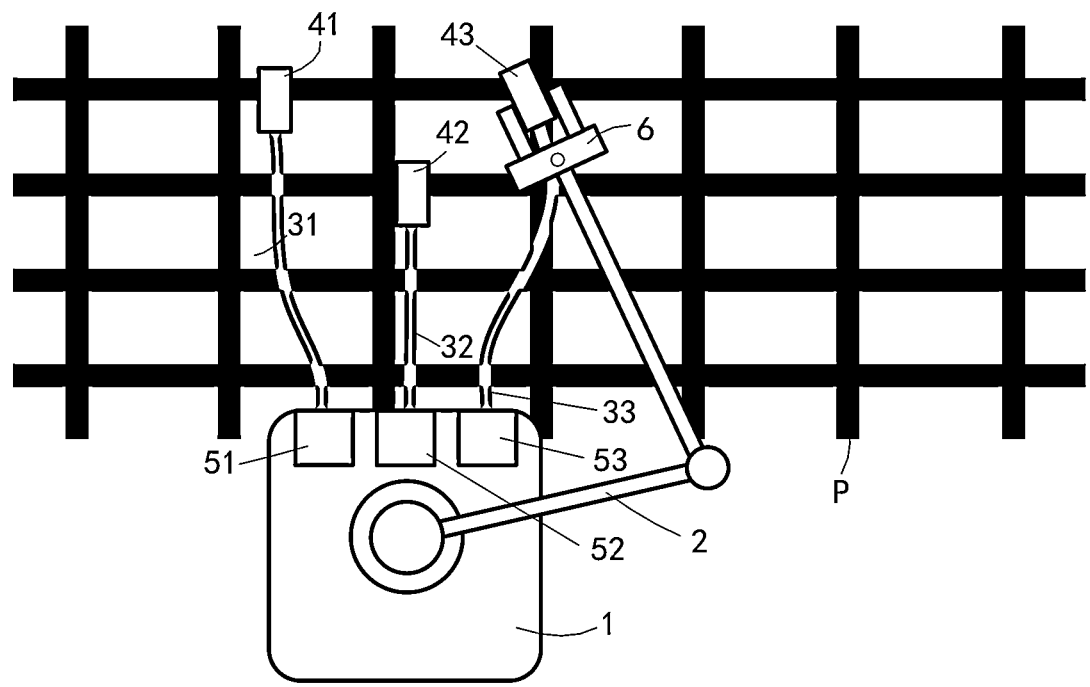

Next, as shown in FIG. 7e, the mechanical arm 2 moves the gripping mechanism 6 to the suspension mechanism 43, so that the gripping mechanism 6 is connected to the suspension mechanism 43. The length of the rope 33 between the suspension mechanism 43 and the machine body 1 is increased, so that the rope 33 is in the loose state and has a proper length. The mechanical arm 2 places the suspension mechanism 43 in a proper position on the object structure P, so that the suspension mechanism 43 is connected to the object structure P. The gripping mechanism 6 disengages the suspension mechanism 43. This process is equivalent to step 2 described above, that is, the process of step 1 is repeated to place other suspension mechanisms.

Figure 7F:
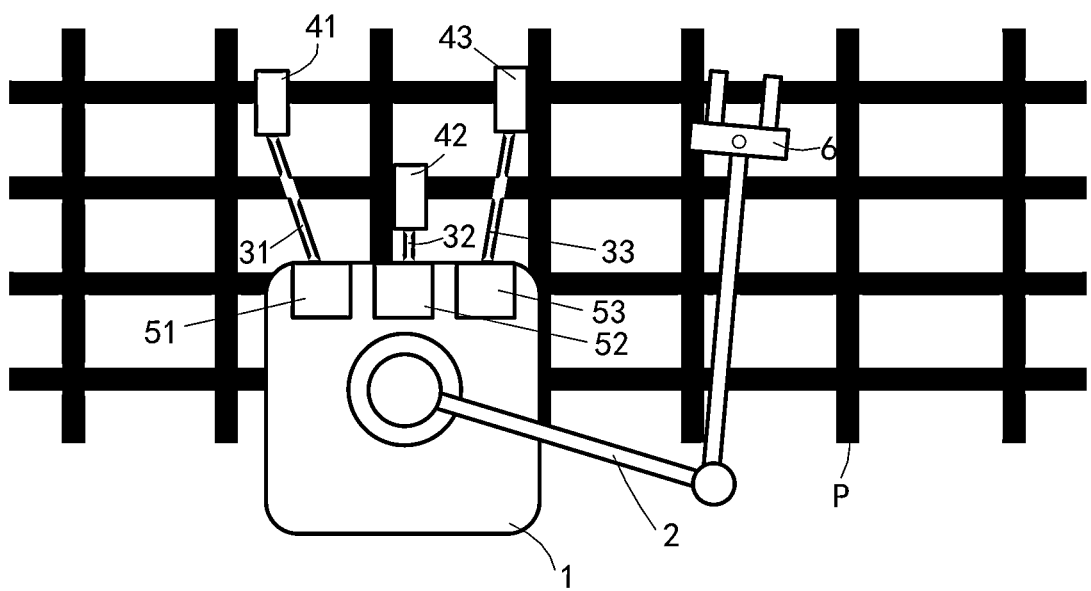

Then, as shown in FIG. 7f, the three reel mechanisms 5 wind the ropes to shorten the lengths of the ropes between the three suspension mechanisms 4 and the machine body 1, so that the ropes pull the machine body 1 to move on the object structure P. This process is equivalent to step 3 described above.

Figure 8:
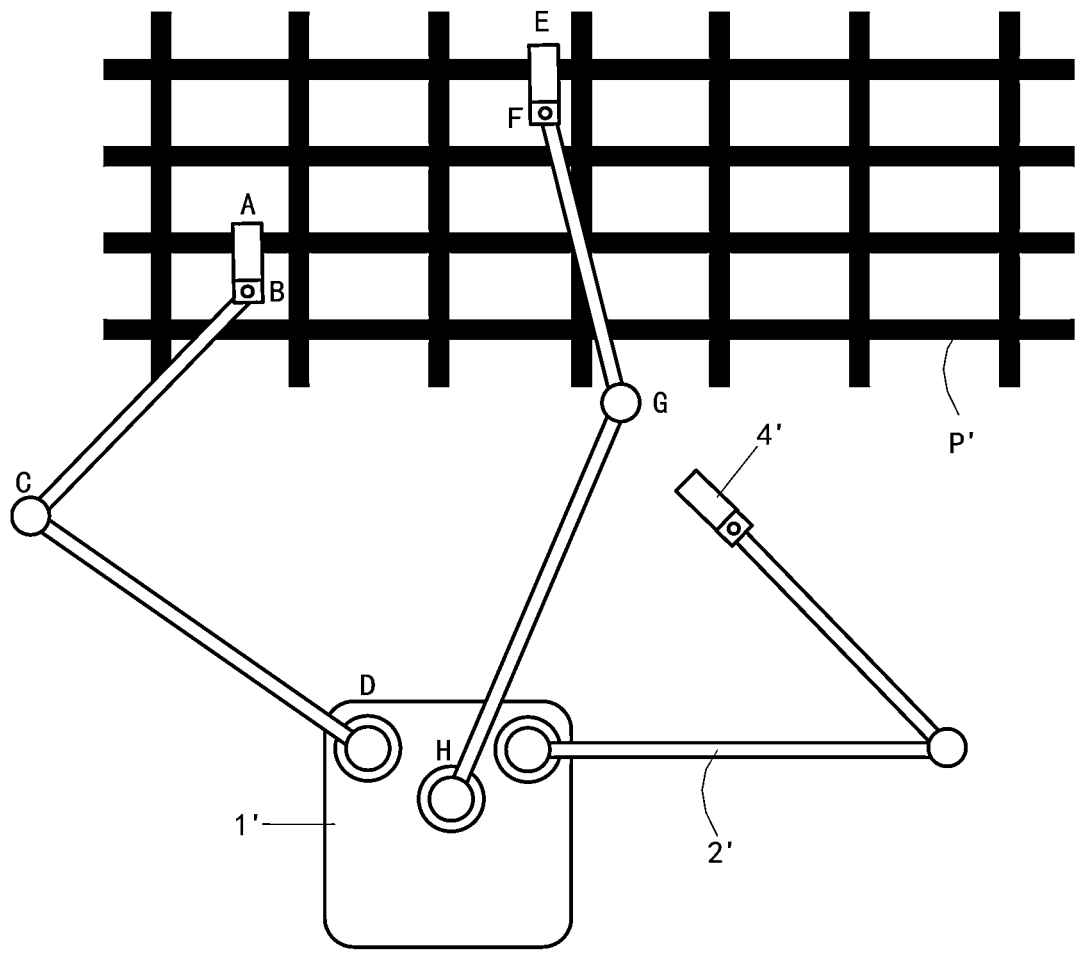
FIG. 8 is a schematic diagram of a structural principle of a multi-arm moving mechanism in the prior technology.
Figure 9:
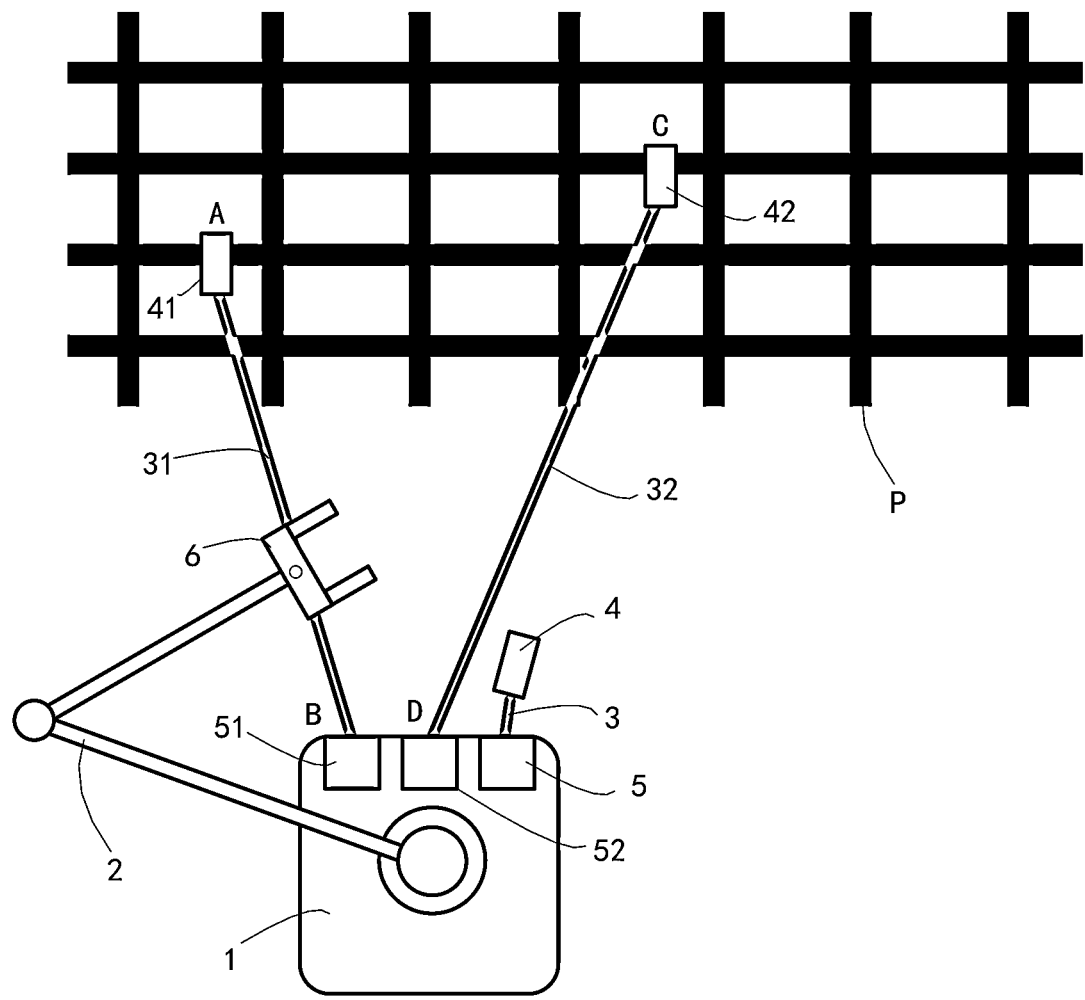
FIG. 9 is a schematic diagram of comparison between a structure in FIG. 8 and a climbing machine according to the present invention.

With the foregoing operations repeated, the machine body can move on the object structure P. Referring to FIG. 8 and FIG. 9, the climbing machine in the present invention has the following advantages when compared with an existing multi-arm moving machine.

(1) As shown in FIG. 8, the quantity of mechanical arms 2' disposed on a machine body 1' of the existing multi-arm moving machine is the same as the quantity of suspension mechanisms 4', causing a heavy overall weight of the mechanism. When the mechanical arm 2' has more degrees of freedom, there are more joints and more joint driving motors, and the overall weight increases sharply. In the present invention, only one mechanical arm 2 is required to move multiple suspension mechanisms 4. The present invention greatly reduces the overall weight of the moving mechanism by reducing the quantity of mechanical arms 2 and by using ultralight ropes 3.

(2) A front end of each mechanical arm 2' of the existing multi-arm moving mechanism cannot be disengaged from the suspension mechanism 4', resulting in a unitary function of the mechanical arm 2'. In the present invention, the mechanical arm 2 can be disengaged from the suspension mechanism 4. Therefore, the mechanical arm 2 can further play another role. For example, the mechanical arm 2 can grip a camera after being disengaged from the suspension mechanism 4, to perform photographing. For another example, the mechanical arm 2 can grip a detection apparatus after being disengaged from the suspension mechanism 4 to implement a detection operation.

(3) The existing multi-arm moving mechanism shown in FIG. 8 is used as an example. A polygon ABCDEFGH is formed by combining a suspension point of a first suspension mechanism, joints of a first mechanical arm, a suspension point of a second suspension mechanism, and joints of a second mechanical arm. As all the joints of the mechanical arms 2' are motor-driven and interfere with each other during moving, all the joints need to strictly coordinate with each other, which is highly difficult to control. If an action of one joint is faulty, the polygon ABCDEFGH is stuck, causing serious problems such as a burnt motor and a broken mechanism. In the present invention, the ropes 3 are flexible and do not cause problems such as a stuck mechanism and mechanism interference. FIG. 9 is used as an example for description. A suspension point of the first suspension mechanism 41, the first reel mechanism 51, a suspension point of the second suspension mechanism 42, and the second reel mechanism 52 form a trapezoid ABCD. In a process in which the two reel mechanisms 5 wind or release the ropes 3, the two flexible ropes 3 deform the trapezoid structure arbitrarily, and the two reel mechanisms 5 do not need strict coordination control.

The foregoing descriptions are merely preferred embodiments of the present invention, but are not intended to limit the present invention. Any modification, equivalent replacement, or improvement made without departing from the spirit and principle of the present invention should fall within the protection scope of the present invention.

The invention claimed is:

1. A climbing machine, comprising a machine body, a mechanical arm, and at least two ropes, wherein one end of each rope is connected to a suspension mechanism, and the other end of the rope is connected to the machine body; the suspension mechanism is connected to or disengaged from an object structure, and the length of the rope between the suspension mechanism and the machine body is variable; through dragging or pulling of the rope, the suspension mechanism enables the machine body to move on the object structure; the mechanical arm has one lever arm revolute controlled by a motor and two or more degrees of freedom; a gripping mechanism is disposed at a front end of the mechanical arm, and a rear end of the mechanical arm is mounted on the machine body; the gripping mechanism has a spatial movement capability and/or an angle adjustment capability when driven by the mechanical arm, and is capable of gripping and moving any suspension mechanism and being disengaged from a gripped suspension mechanism,
wherein one or more damping mechanisms are disposed on the machine body, and the damping mechanism is capable of generating a damping force by using an air flow, and
wherein a shaking state detection apparatus is disposed on the machine body, and the shaking state detection apparatus is capable of detecting a shaking state of the machine body.

2. The climbing machine according to claim 1, wherein the machine body comprises a reel mechanism, and the reel mechanism winds or releases the rope between the machine body and the suspension mechanism to change the length of the rope, so that the machine body is capable of moving on the object structure.

3. A climbing machine, comprising a machine body, a mechanical arm, and at least two ropes, wherein one end of each rope is connected to a suspension mechanism, and the other end of the rope is connected to the machine body;
the suspension mechanism is connected to or disengaged from an object structure, and the length of the rope between the suspension mechanism and the machine body is variable;
through dragging or pulling of the rope, the suspension mechanism enables the machine body to move on the object structure; the mechanical arm has one or more degrees of freedom; a gripping mechanism is disposed at a front end of the mechanical arm, and a rear end of the mechanical arm is mounted on the machine body; the gripping mechanism has a spatial movement capability and/or an angle adjustment capability when driven by the mechanical arm, and is capable of gripping and moving any suspension mechanism and being disengaged from a gripped suspension mechanism, wherein the suspension mechanism comprises a reel mechanism, and the reel mechanism winds or releases the rope between the suspension mechanism and the machine body to change the length of the rope, so that the machine body is capable of moving on the object structure.

4. The climbing machine according to claim 1, wherein the gripping mechanism comprises a magnetic suction device, a magnetically sucked magnetic conductive surface is disposed on the suspension mechanism, and the magnetic suction device is capable of sucking or being disengaged from the suspension mechanism.

5. The climbing machine according to claim 1, wherein the gripping mechanism comprises a mechanical claw, and the mechanical claw opens or closes to disengage or grip the suspension mechanism.

6. The climbing machine according to claim 1, wherein the suspension mechanism comprises a hook, and the hook hooks or disengages the object structure, to implement connection or disengagement between the suspension mechanism and the object structure.

7. The climbing machine according to claim 1, wherein the suspension mechanism comprises a sucker, and the sucker is used to suck or disengage the object structure, to implement suction or disengagement between the suspension mechanism and the object structure.

8. The climbing machine according to claim 1, wherein the damping mechanism comprises a rotor apparatus, and the rotor apparatus uses a force generated by a rotor through rotation in the air to reduce shaking of the machine body in a suspended state.

9. The climbing machine according to claim 1, wherein the damping mechanism comprises an air injection apparatus, and the air injection apparatus uses a reaction thrust of air injection to reduce shaking of the machine body in a suspended state.

10. The climbing machine according to claim 1, wherein several wheels are disposed on the machine body.

11. A moving method for the climbing machine according to claim 1, comprising the following steps:
step 1: moving, by the mechanical arm, the gripping mechanism to one of the suspension mechanisms, so that the gripping mechanism is connected to the suspension mechanism; increasing the length of the rope between the suspension mechanism and the machine body, so that the rope is in a loose state; placing, by the mechanical arm, the suspension mechanism in a proper position on the object structure, so that the suspension mechanism is connected to the object structure; and disengaging, by the gripping mechanism, the suspension mechanism, wherein placing the suspension mechanism further includes controlling positions and angles of the suspension mechanism by controlling a lever arm revolute of the mechanical arm via a motor;

step 2: repeating step 1 based on an actual requirement, so that other suspension mechanisms are placed in proper positions on the object structure and are connected to the object structure;

step 3: shortening the length of a rope between each suspension mechanism and the machine body, so that the rope pulls the machine body to move on the object structure;

step 4: repeating step 1, step 2, and step 3, so that the machine body is capable of moving on the object structures step 5: detecting, by the shaking state detection apparatus, a shaking frequency of the machine body; and step 6: generating, by the damping mechanism disposed on the machine body, a damping force responsive to the shaking frequency of the machine body.

* * * * *